(No Model.)

J. B. HAWLEY.
PLOW.

No. 409,202. Patented Aug. 20, 1889.

Witnesses:
Wm. P. Burris
G. B. Towles

Inventor:
John B. Hawley
By H. A. Daniels
Attorney

UNITED STATES PATENT OFFICE.

JOHN B. HAWLEY, OF HAMDEN, NEW YORK.

PLOW.

SPECIFICATION forming part of Letters Patent No. 409,202, dated August 20, 1889.

Application filed December 12, 1888. Serial No. 293,403. (No model.)

*To all whom it may concern:*

Be it known that I, JOHN B. HAWLEY, a citizen of the United States, residing at Hamden, in the county of Delaware and State of New York, have invented a new and useful Improvement in Reversible Side-Hill Plows, of which the following is a specification.

My invention relates to an improvement in that particular kind of side-hill plows which are reversed by rolling or turning the plowshare and mold-board underneath the beam and handles and to the right or left of the standard; and the object of the improvement is to more certainly and thoroughly turn over the sod or soil while it is being plowed, and to prevent it from either passing over the rear of the mold-board or from again falling back into its own furrow after the plow has left it, as is frequently the case when plowing deep or upon flat land. I attain this object by means of a device and mechanism illustrated in the accompanying drawings, forming a part of this specification, in which—

Figure 1:
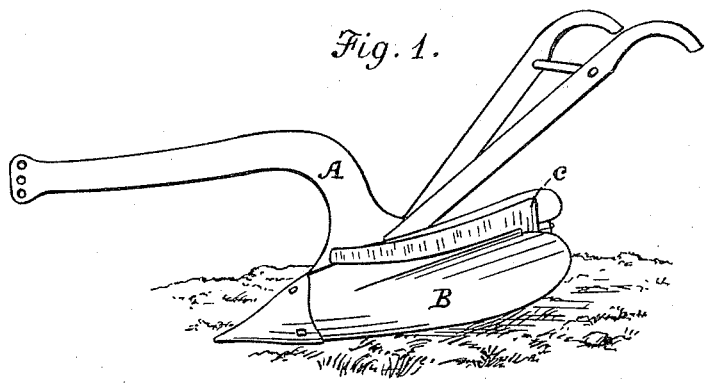
Figure 2:
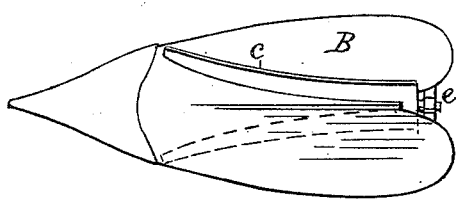
Figure 3:
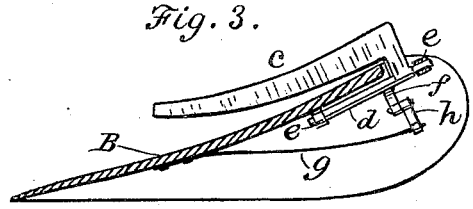
Figure 4:
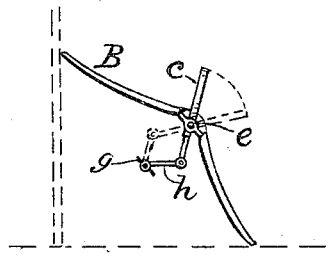

Figure 1 is a side view of a plow complete with my improvement attached. Fig. 2 is a top view of the share and mold-board. Fig. 3 is a sectional view of the mold-board and share on its longitudinal center line, and also a side view of my improvement attached as it appears in the central part of its movement while it is being reversed. Fig. 4 is a rear view of the mold-board with my improvement.

Similar letters refer to similar parts throughout the several views.

$c$ is a bar or plate, preferably of steel, made on its lower edge of such form as to fit the contour of the mold-board B when in position for work, which position is shown by the drawings, and also the dotted lines in Fig. 2. The rear end of this plate $c$ is formed into a round shank $d$, which is turned forward and underneath the plate on the same plane, but not in a parallel line, and is attached to the mold-board of the plow by passing through eyes or holes in lugs or bearings $e\ e$ in the center of the mold-board and underneath its rear end.

The plate $c$ is made to turn in its bearings, when required for adjustment, either to the right or left, as shown by dotted lines, Fig. 4. The axis of the shank $d$ in its bearings not being parallel with the plate $c$, but at an open angle with it, it follows that as the plate is reversed or turned from one side to the other its forward end, or the end opposite the shank, will describe a correspondingly large circle, and in its reversal from side to side will pass clear of the center of the mold-board, as shown in Fig. 3. The particular angle required depends upon the breadth and form of the mold-board, but should be such that the forward end of the plate $c$ will just pass from one side to the other of the mold-board when reversed, while the rear end of the plate still remains in the center, but by its partial revolution on its axis in its bearings $e$ the whole plate is inclined either to the right or left, thus forming practically a continuation of the face of either side of the mold-board when adjusted for use.

In a plow that I now have in operation the angle mentioned is about five degrees.

$f$ is a projecting arm on the shank $d$, which serves as a stop to the movement of the plate $c$ by striking the under side of the mold-board when the reversal is completed.

$g$ is a flat spring attached to the under side of the mold-board, and $h$ is a short connecting-rod between the spring $g$ and the arm $f$, by which the plate $c$ is thrown over and held either to the right or left, as required, as shown in Figs. 3 and 4.

In operation, after the plow itself is reversed, the plowman reverses the plate $c$ by pushing it over with his foot or otherwise until its forward end strikes the standard A, as shown in Fig. 1.

Having now described my invention, what I claim as new, and desire to secure by Letters Patent, is—

1. The combination, in a reversible side-hill plow, of the reversible plate $c$, having a shank $d$, resting in bearings $e$, and having an arm $f$, spring $g$, and connecting-rod $h$, all substantially as shown and described, and for the purposes specified.

2. The combination, with a mold-board, of the reversible plate $c$, provided with a shank which extends under the mold-board and rests in bearings carried by the mold-board, substantially as and for the purposes described.

JNO. B. HAWLEY.

Witnesses:
 WILLIAM LEWIS,
 M. C. LEWIS.